Aug. 21, 1956 H. WALD 2,760,150

ELECTRIC CIRCUIT FOR SPARKLESS PERFORMANCE OF PERIODICALLY REPETITIVE SWITCHING PROCESSES

Filed June 3, 1952 2 Sheets-Sheet 1

INVENTOR.

Herman Wald

INVENTOR.
Herman Wald

United States Patent Office 2,760,150
Patented Aug. 21, 1956

2,760,150

ELECTRIC CIRCUIT FOR SPARKLESS PERFORMANCE OF PERIODICALLY REPETITIVE SWITCHING PROCESSES

Herman Wald, Astoria, N. Y.

Application June 3, 1952, Serial No. 291,400
8 Claims. (Cl. 324—11)

The invention described herewith is generally related to impulse relay systems with periodically repetitive switching used for making and breaking the continuity of a constant current source. The present invention will be treated with particular reference to vibrator power supply systems converting a current from a low voltage into current having a higher voltage. Such a vibrator system comprises usually a step-up transformer having a center tapped primary winding, whereby the applied vibratory contact system makes the current to flow alternately through the two halves of the primary winding, the rectification of the higher voltage can be accomplished either by means of synchronous contacts connected with the secondary circuit or by means of rectifier tube.

It is generally known that at the problem of the interruption phenomena the switching-on process starting with current zero produces little harm for the contacts, as the current increases only slowly because of the self-inductance and consequently no appreciable induced voltage can occur.

With this consideration the invention under discussion will primarily be restricted to the improvement of the switching-off process when the current has its constant maximum amplitude and close to the end of the contact separation when its variable resistance reaches an approximate infinite value, induced voltages of excessive magnitude will appear across the contacts as being produced by the enormous rate of change of current at the moment of complete separation, and the produced arc will lengthen the time of interruption until the contact-voltage will drop below the arc voltage.

Because of the arcing conditions produced by the interruption of currents of higher intensity, the heat capacity of the contact material must be such as to absorb the heat developed during the interruption without excessive temperature rise and without being destroyed. For this reason in the practical application we are using Tungsten material which better withstands deterioration of the contact surfaces, but its greater resistance will definitely develop a fairly high temperature rise during the steady state of the on-contact time producing an unuseful energy loss and at the same time its contacting sensitivity is much reduced compared to silver or copper with low resistance characteristic.

As we stated above, at the break of the contacts, an excessively high induced transient voltage will appear because of the collapse of the magnetic flux. If we wish to control this transient condition, the general adopted method consists of connecting a timing capacitor across the transformer winding to produce at the break of the contacts one damped voltage-wave oscillation to exactly close the currentless state of the off-contact time-period for providing the required complete reversal of the induced voltage and to make the contact closing of the next cycle with zero voltage difference between it and the applied battery voltage.

A complete reversal or 100% closure is impossible to get practically, as it would require an exact time-symmetry and equal magnetization action in the two halves of primary winding, the usual transformer-windings construction precludes this possibility. Due to different variations in operating conditions a 65% closure or voltage reversal can be obtained, whereby at the closing of the contacts there will be a phase difference between the induced oscillating voltage-wave and the battery voltage of the next half cycle. This closure percentage decreases during usages, as the contact erosion changes the off-contact time. Consequently the contacts are subject to sparking and arcing followed by disastrous contact erosion providing a short vibrator life.

It can easily be understood that the above mentioned method tries only to reduce the peak current values occurring at the moment of the switching action of the contacts. It is quite evident that even under ideal conditions, whereby the transient currents could completely be eliminated, the break of the contacts will always take place under full current-intensity in the primary circuit which fact is alone sufficient to destroy the contact surfaces within a certain limited time-period of operation.

The object of this invention is an improvement of such impulse relay or vibrator circuits enabling the making and breaking of the contacts to take place during an approximately zero value of the current.

We will introduce the following principles:

1. We insert self-inductance L and capacitance C in series with the primary circuit of a transformer. The sudden application of a constant potential source by closing the switch will produce an oscillatory current in a damped sine-wave form or a non-oscillatory exponentially damped hyperbolic sine-wave, depending upon the proper choice of the circuit parameters L and C with determined relationship to the ohmic resistance R of the transformer circuit. The parameters L and C must be so chosen that the flow duration or time-interval of a half-period of the oscillating current wave, with due consideration to the damping effect in transformer circuit, should be less than the time-interval or on-contact closure time determined by the closing time-efficiency of the natural mechanical vibrating frequency of the vibrating switch.

To completely secure that independent of any unexpected possible deviations in the circuit values, etc., the interruption should always take place under the desired currentless state, the time-length of the oscillating half-wave must definitely be less, by proper choice of the parameters, than the closing time of the mechanical vibrating frequency of the switch and the possible flow of the opposite or negative half-wave could be prevented by different methods as follows:

*a*. Suppose we insert an additional ohmic resistance in series with the primary or secondary circuit, which resistance will be short-circuited by an auxiliary contact during the predetermined and slightly shorter time-interval than the flow-duration of the half sine-wave oscillation of length $\eta\sqrt{LC}$. At the moment when the auxiliary contact opens, a sudden change from oscillatory to non-oscillatory state will actually occur whereby producing, in continuation, an exponentially damped hyperbolic sine-wave with rapid slope to the asymptotic zero value resulting in a currentless state for the later moment when the commutation of the primary contact takes place. This result can be obtained if the total effective ohmic resistance, referred to the primary, is predetermined such that after the sudden change its value becomes slightly above the critical value $R=2\sqrt{L/C}$, separating the oscillatory from the non-oscillatory state.

The same effect could also be obtained by the parallel connection of an additional capacitance in order to satisfy the condition $R>2\sqrt{L/C}$ without suddenly increasing the existing ohmic resistance of the circuit at the end of the oscillating half-wave period, but this method is limited by the mechanical vibrating frequency of the movable contact blade imposed upon the circuit.

*b*. By using any resistive means with a high resistance character to current flow in the opposite direction, for example a metallic rectifier.

2. After a completed half-cycle of oscillation, that is at the currentless state, the condenser has acquired a certain amount of charge in counterbalancing the constant E voltage. This condenser charge must be discharged by transmitting a current in the opposite (−E) direction in order to enable it to produce the next half-wave oscillation for the required repetitive recurrent half-wave transient oscillations of the primary current. To get this result, we have to establish a periodical reversal of the battery E voltage, whereby both the condenser and battery voltage will transmit together a current in the same direction, and a new transient oscillation will start. This reversal could be obtained, for instance, by the application of two E voltages in series with a center-tapped connection to one single primary winding whereby by alternate closing of −E and +E, the battery current will flow periodically in reversed direction through the same half-primary winding.

3. The capacitance C could be placed in the secondary circuit with the reduced value $Cr^2$ ($r$=turn ratio). Because of the parallel reflection to the primary, we have to insert an additional self-inductance L in series with the primary circuit, in order to create an L, C series circuit required to produce oscillation. In this case a single voltage source E can be connected to the center-tap of the double primary winding, whereby we accomplish a periodical reversal of the battery current in closing alternately either half of the primary winding.

4. If the parameters L and C are initially so chosen that $R>2\sqrt{L/C}$, the shock oscillation of the circuit will produce an exponentially damped hyperbolic sinve-wave. The capacitance must be sufficiently large for obtaining a parameter relationship such that the existing small ohmic resistance of the circuit should be slightly above the critical value. Evidently the time required for the current to decay until it is nearly vanished, must definitely be less than the on-contact time of the primary contact, which on the other hand is limited by the predetermined natural mechanical vibrating frequency of the movable contact blade.

A better understanding of the subject of the invention will be apparent from the following detailed description and accompanied drawings taken in conjunction with the appended claims, in which:

BASIC PRINCIPLE OF OPERATION

(1) *Non-oscillatory hyperbolic case or aperiodic case*

Figures 1, 2, 3, 4, 5, 6, 7, 8, 9:
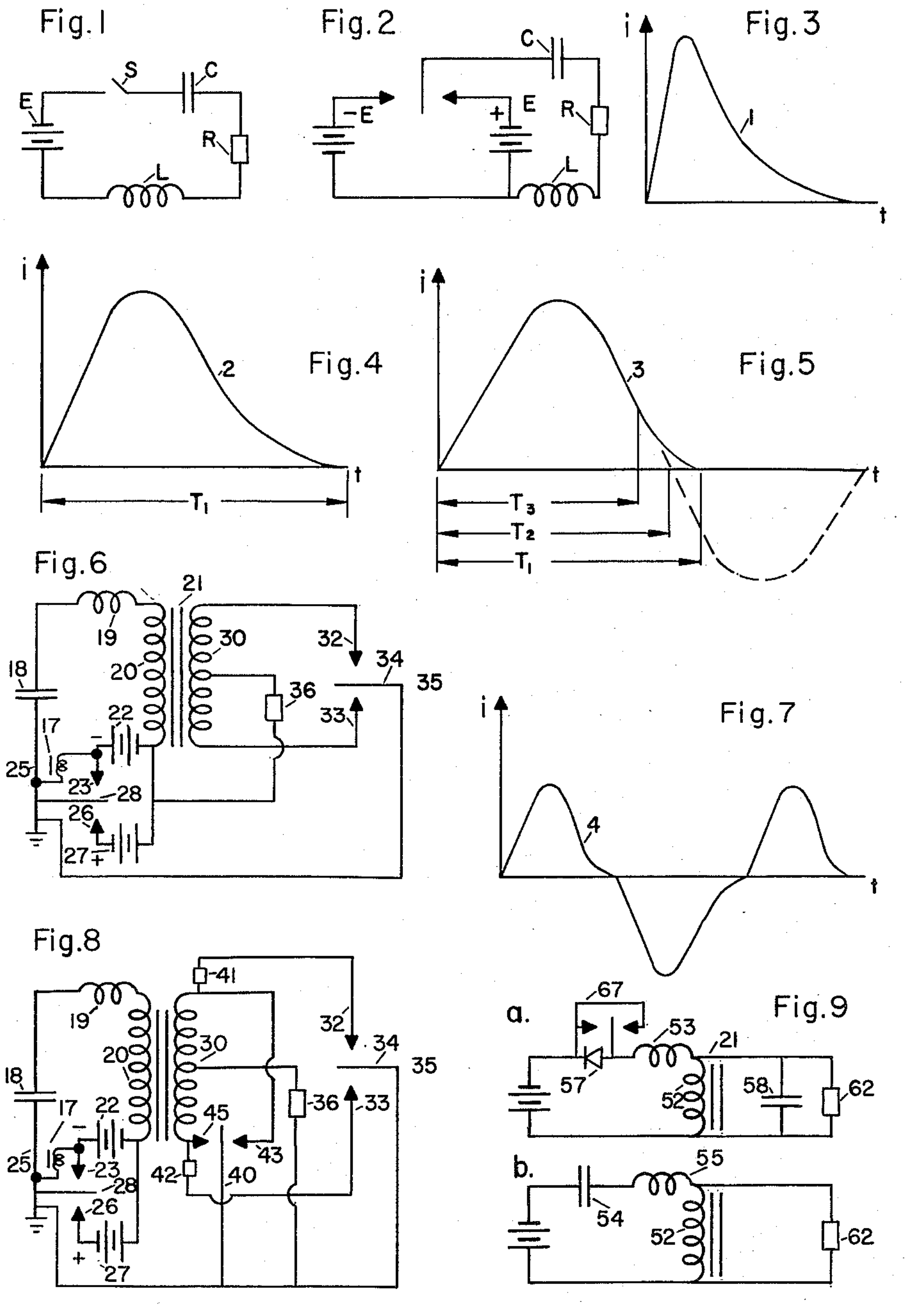
Figure 1 is a schematic diagram for illustrating the theory of operation of the present invention.
Figure 2 is an other circuit diagram for explaining the theory of operation of the present invention.
Figure 3 is a curve showing the variation of current with time in the circuit of Figure 1 at closing of the switch.
Figure 4 is a plot of current vs. time for different parameters of the circuit of Figure 1 showing the critically damped case.
Figure 5 is a plot of current vs. time for the current flowing in the circuit of Figure 1 showing the oscillatory case.
Figure 6 is a circuit diagram showing one embodiment of the present invention.
Figure 7 is a plot of current vs. time for the circuit of Figure 6.
Figure 8 is another embodiment of the present invention.
Figure 9 shows two equivalent circuits of the switching device of the present invention, the first of which shows the oscillatory case by using a metallic rectifier in series with the primary circuit for preventing the current flow in the opposite direction.

Referring first to Figures 1 and 2, there is shown a condenser C in series with inductance L and a resistance R in series with a battery of voltage E and a switch S.

When switch S is closed and a plot of current in this circuit $i$ vs. time $t$ is taken, the curve of Figure 3 is obtained which corresponds to the case in which the relationship between the resistance, capacitance and inductance is such that no oscillations occur in the circuit, this case being commonly known as the overdamped case.

It will be seen from Figure 3 that the current in the circuit of Figure 1 increases from zero to a maximum value and then dies down as the condenser C charges to the full value of the battery voltage E. This is due to the fact that the self-inductance L of the circuit requires that the current be zero at $t=0$ and the series capacitance C also requires that the final or steady state value of current also be zero by acquiring a charge that causes the voltage across the condenser C to counterbalance the battery voltage E. For this case the circuit differential equation is $$Ri+L\frac{di}{dt}+\frac{q}{C}=E$$

and the solution for the current $i$ for this aperiodic case, in which R is much greater than $2\sqrt{L/C}$, is:

$$i=\frac{E}{bL}e^{-at}\sinh bt$$

where $$a=\frac{-R}{2L} \text{ and } b=\sqrt{\frac{R^2}{4L^2}-\frac{1}{LC}}$$

(1*a*) *Periodical case—repetitive switching*

Referring to Figures 2 and 6, in the circuit of Figure 2 switch S has now been shown to be a single pull double throw switch having each of the stationary contacts connected to individual batteries, each having a voltage of magnitude E.

At the end of the first half cycle, condenser C acquires a back voltage approximately equal in magnitude and opposed in sign with the battery voltage E. By periodical reversals of the switch S and, therefore, of the battery voltage +E since the two batteries are here shown connected in series, the back voltage for condenser C adds to the reverse battery voltage −E to provide a double driving voltage which causes a current to flow in the same direction due to both the discharging of the condenser C and one of the batteries E so that the condenser C may be charged now in the opposite direction.

Aside from losses in the resistance R, the charge of condenser C is always returned to the circuit and no other losses can occur during this repetitive switching action.

(2) *Critically damped case*

This is the limiting case of the former aperiodic case when the parameters of the circuit are selected such that $R=2\sqrt{L/C}$. Under this condition the radical-expression $$\sqrt{\frac{R^2}{4L^2}-\frac{1}{LC}}=0$$

and after $$\frac{di}{dt}=0$$

is reached the $$-L\frac{di}{dt}$$

becomes a driving voltage, and the condenser back-voltage $q/C$ will always be less than E, as long as $$Ri=-L\frac{di}{dt}$$

and will build up to the final value EC.

The current $i$ from the preceding case was $$i=\frac{E}{Lb}e^{-at}\sinh bt$$

and by carrying the limit $b\rightarrow 0$, or $\sinh bt\rightarrow bt$, in this limiting case we get:

$$i=\frac{E}{Lb}e^{-at}bt=\frac{E}{L}e^{-at}t$$

and the maximum of the current $i$ occurs when $$\frac{di}{dt}=0$$

or $$\frac{d}{dt}\frac{E}{L}e^{-at}t=\frac{E}{L}e^{-at}-ate^{-at}=0$$

from which the time of maximum current $$t_m=1/a=2L/R$$

and the maximum value of the curent $i$ at this moment is:

$$i_{\max}=0.736\frac{E}{R}$$

By inspecting both equations for current $i$, we may observe that both consist of the product of an exponentially decreasing function and an increasing function which is a hyperbolic sine in the former case and simply $t$ in this case. According to the series development:

$$\sinh t=t+\frac{t^3}{3'}+\frac{t^5}{5'}$$

so this function increases much faster with time than $t$ alone, consequently the whole function of the critical case will drop off in a much shorter time than in the aperiodic case.

The important characteristic of this case lies in the fact that the form of this current curve 2 shown on Figure 4 appears very close to a sine wave. By proper choice of the parameters, the current reduces to an approximate zero value at the end of the on-closure time $T_1$ which is practically equivalent to four times $t_m$ when maximum current occurs.

We assume the following data to be encountered in practice; $R=1.2$ ohms, $T_1=1/275=0.0036$ second, therefore, we may select for the circuit parameters, as follows; C=1500 mf., and L=0.00054 henry, and by substituting the above values in the equation $R=2\sqrt{L/C}$, the required condition is accomplished. In order to show that four times the $t_m$ corresponds to the on-closure time-period $T_1$, we make the following substitutions;

$$4\times 1/a=8L/R=8L/\sqrt{4L/C}=4\sqrt{LC}=4\sqrt{.00054\times .0015}=0.0036$$

which is the required on-closure time-period $T_1$.

The total energy supplied to the circuit is $E^2C$, the half of which drops across the condenser C and the other half drops across the total resistance. Since the condenser returns its full energy $E^2C/2$ to the circuit, therefore the half of which or $E^2C/4$ is also delivered to the resistance. Consequently the total energy delivered to the resistance during steady state operation amounts to $E^2C/2+E^2C/4=(E(1+\frac{1}{4}))^2C/2$. By setting C=1500 mf., and E=9½ volts, we get:

$$(E(1+\tfrac{1}{4}))^2C/2=0.11 \text{ watt-second}$$

By comparing this output with a normal 6 volt square-wave operation, we get: $E^2/R=36/1.2=30$ watts and multiplied with the on-closure time 0.0036 seconds, yields to the same result or 0.11 watt-second. We may conclude that for obtaining the same output, we have to increase the 6 volt input to 9½ volts if other conditions remain unchanged. However, by a corresponding change of the transformer design, a 6 volt input can be used with the same efficiency.

(3) *Oscillatory case*

If the parameters of the circuit are chosen such that $R<2\sqrt{L/C}$ we obtain the oscillatory form of current curve 3 shown in Fig. 5, in the continuous line for the first half-cycle. $T_3$ designates the time-moment when the resistance of the circuit is suddenly increased for producing a change to a non-oscillatory state. $T_2$ denotes the time-moment when the oscillatory current shown in the dotted line would flow through zero if it would not have been cut off. $T_1$ denotes the time-moment an instant later when the primary contact opens the circuit in a currentless state.

At the time-moment $T_3$, by periodical opening and short circuiting an additional resistance, the total effective ohmic resistance referred to the primary may become slightly above the critical value. Consequently the oscillatory current continues to flow as an exponentially damped hyperbolic wave shown by the continuous line with rapid slope to the asymptotic zero value. The periodically reversed operation and energy considerations are otherwise similar to that of the critical case.

(4) *Condenser in secondary circuit*

Figures 14, 16:
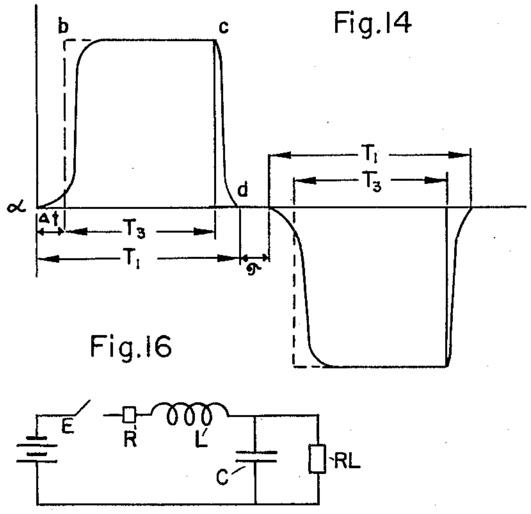
Figure 14 is a plot of current vs. time for the circuit of Figure 12 or 13.
Figure 16 is a schematic circuit diagram for explaining the theory of operation of the present invention, showing the use of a condenser in the secondary circuit of the present switching device.

The equivalent circuit of this case is shown in Fig. 16. In order to obtain the periodical reversal of the condenser voltage, it is connected parallel to the secondary winding by setting its value $Cr^2$ reduced to the primary circuit, where $r$ is the turn ratio. For producing the required transient sine current wave in the primary circuit, the damping effect of the load resistance must be taken into consideration at the selection of the parameters of the circuit, however, the mutual inductance may be disregarded. The transient solution of the differential equation of this circuit shows that under certain conditions either an oscillatory or an aperiodic form of current wave can be obtained in the primary circuit.

Using a conventional step-up transformer, we may assume a turn ratio of 1/36 and by applying the calculated 1500 mf. required in the critical case we obtain $Cr^2=1$ mf. for the value of the condenser parallel with the secondary winding.

In the case of producing a critically damped sine wave of current, the parameters of the circuit must satisfy the condition $R=2L/Cr^2$, and the operation will then otherwise be similar to that of using the condenser in series with the primary winding.

APPLICATIONS

Referring first to Figure 6 showing one embodiment of the present invention, an electromagnetic driving coil 17 is connected between movable contact 28 and contact 23, a condenser 18 is here shown in series with an inductance 19 and a primary winding 20 of a step-up transformer 21. In series with primary winding 20 is also a battery 22 having the polarity indicated and magnitude E connected to a terminal 23 of a switch 25. The movable contact 28 of switch 25 is connected to the condenser 18, and switch 25 is further provided with another stationary contact 26 which is connected to a second battery 27 also of magnitude E which in relation to the movable contact 28 has a polarity opposite to that of battery 22 so that depending on the position of the movable contact 28 with switch 25, the condenser 18 is charged either in one or in the opposite polarity.

Connected on one side of the common terminal of batteries 22, 27 is a load resistor 36 which is connected on the other side to the center of the secondary 30 of the step-up transformer 21. The secondary 30 is connected also to two stationary terminals 32 and 33 of a switch 35 having a movable contact 34 movable between contacts 32 and 33. Operation of switch 25 in the primary winding will cause an exponentially or critically damped current wave such as that shown in Figure 7, which is rectified by the contacts 32, 33 in the secondary circuit.

Figure 8 is a modification of the embodiment of Figure 6 producing an oscillatory current wave as shown on Figure 5, wherein a third switching element 40 has been added in the secondary circuit of transformer 21 so that in conjunction with the newly added resistors 41 and 42 in series with the secondary winding 30, a better sparkless operation of this switching device is achieved.

Referring to Figure 8, the two batteries 22 and 27 of voltage E are each in series with the primary winding 20 of transformer 21 and condenser 18, as previously mentioned, is also in series with primary winding 20 and with an inductance 19. All the movable contacts of the vibrating reeds of switches 25, 35 and 40 are connected to the common ground. When contact 23 is closed, a +E voltage is applied to the primary circuit which causes, by proper selection of the circuit parameters, a transient oscillating sine wave primary current of Figure 5, so that when the auxiliary cooperating contact 43 is opened before the end of a half cycle, an additional resistance 41 is inserted in series with the secondary winding 30 to provide a sudden change in the parameters of the circuit so that it becomes non-oscillatory and reduces the current to approximately zero value when an instant later the interruption of the primary contact 23 takes place. Thus, sparkless operation is obtained.

When the current in the primary circuit is zero, the condenser 18 has its full —E voltage which counterbalances the battery voltage +E.

In order to obtain the required repetitive succession of half cycles, the condenser must be periodically discharged. The alternate closing of the contacts 23 and 26 of switch 25 by movable contact 28 produces a periodical reversal of the battery voltage E so that the 180° phase difference between the condenser voltage —E and the battery voltage +E causes the condenser to discharge in the same direction as the battery —E voltage obtained at the closing of contact 26.

At this point a new transient oscillation of a half wave sine current will start. During the following cycle, the sudden insertion of the additional resistance 42 obtained by the operation of the auxiliary switch 40 through engagement with its stationary contact 45 is similar to the previously described operation.

The load resistance 36, as previously mentioned, is connected to the center tap of the secondary winding 30 and to ground with switch 35 providing the usual desired rectification in the secondary circuit of the present device. It should be noted that it is an equivalent spacing between the stationary contacts 23 and 26 in the primary circuit and stationary contacts 32 and 33 in the secondary circuit to secure a synchronous operation or a rectifier is used.

Curve 4 of Figure 7 illustrates then the periodically recurrent critically damped sine wave primary current having intervals of time at which the current is negligibly small corresponding to the times where the primary contacts 23 and 26 can be opened.

Referring now to Figure 9 showing two equivalent circuits of the present switching device, the mutual inductance 52 can be neglected in the calculation of the sine wave signals since it is many times greater than the series inductance 53 or the series inductance 55. The load resistance 62 in the secondary circuit loads the primary circuit by the relationship $R/r^2$ where R is the magnitude of the load resistance, $r$ the turn ratio.

To calculate the duration of the flow of current which is proportional to the $\sqrt{LC}$ of the half cycle sine wave, it is necessary to take into account the damping effect of this load resistance; that is, the half wave length proportional to $\sqrt{LC}$ must always be shorter than the time during which the primary contacts are closed.

More specifically, referring to the lower circuit of Figure 9, the condenser 54 is connected in series in the primary winding of transformer 21. Referring to the upper circuit of Figure 9, a rectifier 57 is connected in series in the primary circuit with the primary winding, while a condenser 58 is connected in parallel with the load 62 in the secondary circuit.

Figure 15:
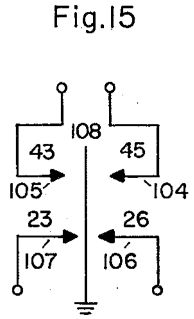
Figure 15 is a detailed schematic drawing of the switching device using the circuits of Figures 12 and 13.

Rectifier 57 serves to prevent the flow of the oscillating transient primary current wave in the opposite direction, due to unexpected variations in the operating conditions of the circuit, whereby it will hold the currentless state until the primary contact an instant later will interrupt the circuit under the zero passage of the primary current. However, this method has a disadvantage of considerable energy loss through its internal resistance in the current flow direction which is added to the negligible ohmic resistance of the primary circuit. In order to eliminate the energy losses, auxiliary contacts 67 in parallel with rectifier 57 are provided so that they will operate in a manner more clearly described hereinafter in connection with Figures 12 and 15. It is understood that the rectifier is short circuited during the major part of the half cycle and opened an instant before the main contact opens. The switching time-difference between the cooperating contact pairs, however, may be set to suit the operating conditions of the circuit.

Figure 10:
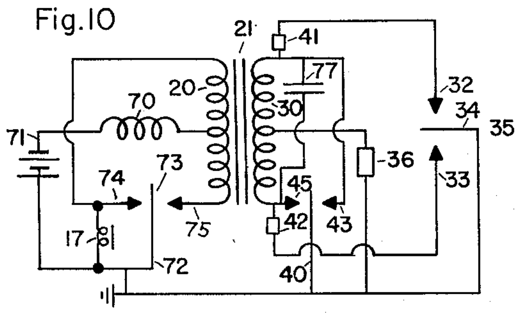
Figure 10 is a circuit diagram of still another embodiment of the present invention.

Referring now to Figure 10 showing another embodiment of the present invention applied to the oscillatory case, it will there be seen that only a single battery is used for providing the desired voltage. In Figure 10 is another coil 70 connected at one end to the center tap of coil 20 of transformer 21 and at other end to battery 71. Switch 72 has its movable contact 73 connected to the other end of battery 71 and the two stationary contacts 74 and 75 connected to the two terminaions of the coil 20.

The secondary circuit is essentially of the type described in connection with Figure 8 except for the addition of a capacitance 77 substituting the C in the usual primary circuit according to the invention, calculated with the turn ratio $C/tr^2$, and is connected at one end to stationary contact 45 of switch 40 and the other end connected to one terminal of secondary winding 30 of transformer 21.

It should be noted that in this case the capacitance C in Figure 10 denoted by numeral 77 is not connected in the primary circuit but is connected in the secondary circuit. By applying this embodiment to operate with the critically damped current curve of Figure 4, the auxiliary contacts and additional resistances in the secondary circuit may be omitted because those elements serve only the purpose of securing the currentless interruption of the oscillatory current shown on Figure 5.

Figure 11:
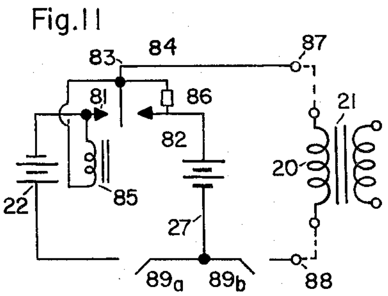
Figure 11 illustrates a shunt type driving coil applied to the circuit of the present invention.

To further clarify the operation of the present device, Figure 11 illustrates an example of the present invention applied to a case in which it is desired to start the vibrator by itself with open primary transformer circuit.

With conventional systems starting to operate under load, a serious transient condition may be imposed upon the transformer during the first few cycles of operation following the first energization of the driving coil. The amplitude of the reed is low; the balance between the pull and inertia cycles is very poor until the normal steady running condition is attained.

One effect of this temporary vibrator characteristic is that at the operation on a frequency lower than that at which it is designed to operate, the maximum flux density is considerably increased which necessitates the supplying of high magnetization currents from the battery which the vibrator contacts must commutate and a rapid deterioration of the contacts will result.

Under the low frequency and low time efficiency condition existing at starting, the usual value of timing capacitance (parallel) in the primary or secondary winding required to match the existing conditions must be different in value than that required for normal running.

The difficulty due to poor starting conditions is completely eliminated by the application of principles according to the invention. On the conventional shunt driver coil type arrangements, the battery current must flow through the primary winding since one-half of the primary coil is in series with it and the battery. After the unit has started, the counter E. M. F. generated in the series transformer primary coil when the inertia contacts are closed is added to the battery voltage to aid in driving the coil. On this basis, after starting 12 volts will drive the operating coil.

In this invention, two batteries in series are used so that their opposite polarities are, respectively, connected to the corresponding contact pair which are shunted by the electromagnetic driving coil 85 or other large resistance 86, whereby we obtain a closed circuit and 12 volts will drive the operating coil.

More specifically, referring to Figure 11, it will there be seen that two batteries 22 and 27 are connected in series through the switch contacts 81 and 82 engageable by movable contact 83. Connected between contacts 81 and 83 is a driving coil 85, whereas between contacts 82 and 83 is a resistance 86. In addition, the center tap connection of the batteries 22 and 27 is connected through the double throw switch 89 to one input terminal 88 of the primary circuit, whereas the movable contact 83 of the switch 84 is connected to the other input terminal 87 of the primary circuit, and the same switch 89 in its first position will start the operation by interconnecting the two batteries.

The operation of this device was described above, and it is here only necessary to point out that the vibrator of Figure 11 will start at opened primary circuit and will continue to run at no load under a double voltage from the moment the primary battery circuit is closed, and after a few cycles when the steady operation is reached the double throw switch 89 will close the primary circuit and the disastrous action of the unsteady state is eliminated. It should be noted, for example, that this starting method can be applied also to Figure 10, or similar primary circuits with single battery, by adding another battery and a resistance as shown on Figure 11 which will operate only during the starting cycles and will be disconnected by a suitable type of switch arrangement after steady operation is reached.

Figure 12:
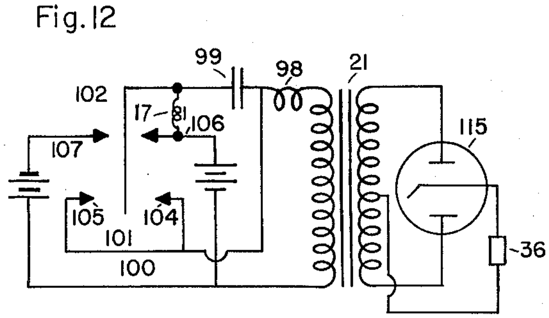
Figure 12 is another embodiment of the present invention showing the use of a square wave form primary current and diode rectifier in the secondary circuit.

Referring finally to Figure 12 showing an embodiment of the present invention in which switch 100 is provided with two pairs of contacts 101 and 102, contact pair 101 consists of two stationary contacts 104 and 105 and contact pair 102 consists of stationary contacts 106 and 107.

The movable contact 108 moves between these stationary contacts. It should be noted, referring to Figure 15, that the travel time of movable contact 108 between contacts 106 and 107 is less than the travel time or the travel length between the stationary contacts 104 and 105. This means that auxiliary contact 104 opens an instant before the main contact 106 and the closing is inverse to this.

It is now possible to understand the operation of the present device with the aid of Figure 14.

It will be assumed that at $T=0$ movable contact 108 is by driving coil 17 caused to close contact 107. This particular point of the curve shown in Figure 14 is denoted by *a*. After a time $\Delta T$ determined by the difference in travel of contact 108 to engage contacts 107 and 105 successively, contact 105 is engaged, which point is shown in Figure 14 at *b* when a negligible magnitude of the primary current is reached. From point *b* to point *c* a constant current will flow, but at point *c* movable contact 108 will now go through the previously described travel but in the opposite direction.

It will, in other words, first disengage contact 105 and then contact 107, points which are shown in Figure 14 by *c* and *d* when the current again becomes zero caused by the charge of the condenser 99 to the counterbalancing battery voltage. After a small interval of time that is denoted by $\tau$, a movable contact 108 will move to close with a similar sequence of operations the other set of stationary contacts 104 and 106.

It should be noted that the previously mentioned time interval $\Delta T=\frac{1}{2}$ of the difference between the travel time of movable contact 108 for engaging contact 105 and to return to its original position and a similar time for engagement of contact 108 with contact 107. However, it would be more favorable to operate the auxiliary contacts 105 or 104 at the closing with a $\Delta T$ considerably shorter than at the opening.

The principle of the invention is used in combination with an auxiliary contact pair (see Figure 15) in the primary circuit also when the condenser 99 is inserted in series with the primary circuit only during the time-differences $\Delta T$ between the closure or opening of the corresponding main and auxiliary contact pairs, therefore during the major part of the half-cycle the current curve becomes a conventional square-wave.

The value of condenser 99 is selected such that during this time-difference $\Delta T$ the condenser is charged to the counterbalancing voltage necessary for securing the interruption of the main contact 106—107 of the battery circuit under currentless state. At the closing of the next half-cycle, the acquired back voltage of the condenser 99 adds to the reversed battery voltage, whereby a sudden discharge of the condenser takes place by returning its charge to the circuit.

In view of a sparkless operation it is necessary to delay this sudden discharge such that after the time-moment $\Delta T$ of short circuiting the condenser by contact 105 no new recharge in the opposite direction shall be across it which may eventually be discharged through contact 105. This condition could be prevented by inserting a self-inductance 98 in series, the value of which depending on the magnitude of $\Delta T$ at the closing. Consequently the current starts to increase at the rate of $E/L$ units per second and retards the rate of discharge of the condenser to satisfy the above requirements. At the interruption of contact 105, however, the self-inductance has negligible influence upon the charging process. This is due to the fact that under given initial conditions the charging current will start at full magnitude $E/R$ when the condenser is suddenly inserted in series and decreases to zero at a rapid rate for providing the currentless state prior to the opening of the main contact 107.

Figure 13:
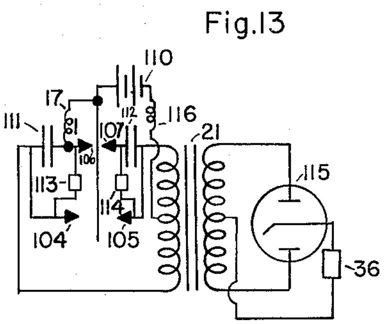
Figure 13 is a modification of the circuit of Figure 12.

Figure 13 shows still another embodiment of the present invention in which only a single battery 110 is used, but two condensers 111 and 112 are connected on one side in series with the main contacts 106 and 107, whereas the other side of the condensers are connected to the respective ends of the primary winding of transformer 21. The resistances 113—114 are connected between the respective main contacts 106—107 and auxiliary contacts 104—105. The self-inductance 116 is in series with the center line of the primary winding and battery 110 in order to be operative during each half-cycle. The switch shown in Figure 13 is similar to the switch 100 shown in Figure 12 and aside from the condensers 111 and 112 the operation of the device shown in Figure 13 is similar to that of Figure 12 except again for the use of a single battery 110.

Current curve shown on Figure 14 applies also to this embodiment. The discharge of the condenser in this case, however, takes place through the resistor during the following pause of the next complete half-cycle. Under usual conditions, the value of this resistance 113 or 114 can be selected so large that it will not affect at all the above charging process, whereby only a negligible amount of current could flow across the condenser at the opening. At the next closing of the other main contact 106, by proper selection of the value of self-inductance 116, the charging of the condenser can be retarded such that only a negligible charge could accumulate on it at the end of $\Delta T$ when the auxiliary contact 104 short circuits it. It is important to note, that the value of the self-inductance 116 is mainly dependent on the magnitude of $\Delta T$ at the closing, the length of which usually amounts to a few percent of the total on-closure time. Therefore the required value of the condenser may be in an acceptable low range.

It should be also noted that in Figures 12 and 13 in the secondary circuit of transformer 21 a double diode 115 is used to perform the desired rectification of the now high secondary voltage. The same working condition is accomplished with the embodiment of Figure 13, only this has the advantage of using one battery and center-tapped primary winding.

The advantage of these types of embodiment as shown in Figures 12 and 13 would be to transfer the same energy with a given battery voltage as can be transferred with the conventional square wave systems.

From the foregoing detailed description it can easily be understood that the interruption of the contacts under approximate zero passage of the primary current will definitely assure a long-life operation of the contact-surfaces and at the same time will also make possible the use of contact material with much lower contact-resistance, to considerably improve the efficiency of performance during the steady-state of current flow.

The principle of the invention described herewith can also be applied to current converters from D. C. line-voltage to A. C. alternating current, where the use of the transformer is omitted.

We may consider as a further advantage of the improved design according to the invention that it will prevent the contact destroying effect produced under the following abnormal or unsteady operating conditions, as follows:

*a. Starting characteristic.*—The unbalanced reed movement during the first few starting cycles requires a much higher magnetization current to be commutated by the primary contacts. The usually applied timing capacitor determined for the off-contact time under normal running conditions cannot match this poor starting characteristic because the frequency of the vibrating switch becomes lower and provides a higher off-contact time.

According to the invention, by using the starting method of Figure 11, the starting inrush currents are eliminated. However, by using the single battery type circuit, we may consider that the lower frequency or longer cycle-time is practically counteracted by the simultaneous occurrence of lower time-efficiency of the on-contact dwelling time, therefore both effects will result in an approximate constant contact-closure time, which is the only necessary and sufficient requirement according to the invention to accomplish the commutation of the primary contact under an approximate zero passage of the current.

*b.* The conventional design with center tapped primary using a layer winding of both secondaries and primaries in sequence, introduces an unbalance of the leakage distribution between the two cooperating half pair of windings. This fact causes an unequal reflection of the timing capacitor into the primary circuit resulting in an unsymmetrical operation, which in turn produces a detrimental effect upon the contact surfaces. According to the invention, the center tapped battery arrangement may use a single primary winding between the two secondaries, whereby a balanced coupling and a complete symmetrical operation is established.

*c.* Any increase in the input voltage will generally produce an increase of frequency and time-efficiency of the on-contact time. This variation, therefore, changes the off-contact time and affects the good operation of the timing capacitor. This inconvenience, however, is eliminated since the frequency increase makes shorter the contact dwell time and the increase in time-efficiency prolongs it such that both effects practically offset each other or sometimes resulting even in a higher on-contact time, which is the only necessary and sufficient requirement according to the invention that the primary contact interruption should take place under approximate zero current.

Finally we may emphasize that by the application of a sine-wave current its maximum and minimum practically coincides with the maximum and minimum contact pressure, therefore a minimum temperature rise of the contact surfaces is secured and the overheating during the current flow is prevented.

Although the present invention as to its objects, advantages, has been described only in connection with a few preferred embodiments thereof, it is not desired to be limited thereby, but it is intended to cover the invention broadly within the scope of the appended claims. I consider all the variations and modifications as within the true spirit of the present invention as disclosed in the foregoing description and defined by the appended claims.

What is claimed is:

1. A periodic switching device for sparkless operation comprising a series circuit having a capacitor, an inductor, a load and a center tapped D. C. supply source, a periodically reversing interrupter switch in said series circuit for making and breaking successively each of the end terminals of said center tapped supply for the periodic charge and discharge of said capacitor, an electromagnetic means operating said switch at a repetition rate such that the making time of said switch with each of said end terminals is somewhat longer than the duration of the exponentially damped sine current wave due to the proper selection of the magnitudes of said inductor, capacitor and load resistance and generated at the instant of the making of said switch, thereby reducing the current flow to zero just before said switch opens the circuit.

2. A periodic switching device for sparkless operation comprising a transformer and a series circuit having a capacitor, an inductor and a center tapped D. C. supply source, the primary winding of said transformer being in series with said capacitor and D. C. supply source, a periodically reversing interrupter switch in said series circuit for making and breaking successively each of the end terminals of said center tapped supply source for the periodic charge and discharge of said capacitor, a secondary circuit connected to the secondary winding of said transformer, a rectifier connected to the secondary winding of said transformer for rectifying the alternating voltage at the secondary of said transformer obtained through repeated operation of said switch connected to said primary winding, an electromagnetic means operating said switch at a repetition rate such that the making time of said switch with each of said end terminals is somewhat longer than duration of the exponentially damped sine current wave due to the proper selection of the magnitudes of said inductor and capacitor and load resistance in said secondary circuit referred to the primary circuit and generated at the instant of the making of said switch, thereby reducing the primary current flow to zero just before said switch opens the primary circuit.

3. A periodic switching device for sparkless operation comprising a transformer and a series circuit having a capacitor, an inductor and a center tapped D. C. supply source, the primary winding of said transformer being in series with said capacitor and D. C. supply source, a periodically reversing interrupter switch in said series circuit for making and breaking successively each of the end terminals of said center tapped supply source for the periodic charge and discharge of said capacitor, a secondary circuit connected to the secondary winding of said transformer, a rectifying means connected to the secondary winding of said transformer for rectifying the alternating voltage at the secondary of said transformer obtained through repeated operation of said switch connected to the primary winding, an electromagnetic means operating said switch at a repetition rate such that the making time of said switch with each of said end terminals is somewhat longer than the duration of a half cycle of the oscillating sine current wave produced within said circuit by the proper selection of the magnitudes of said inductor and capacitor and load resistance in said secondary circuit referred to the primary circuit determining the oscillatory state in said primary circuit, the said oscillation being produced at the instant of making of said switch, an auxiliary switch in said secondary circuit, the movable contact of said auxiliary switch having a travel time longer than the travel time of the movable contact of said first switch in said primary circuit, a resistance element connected in series in said secondary circuit, said auxiliary switch short circuiting said resistance element during the major part of the half cycle of said primary oscillating current wave and inserting said resistance element in said secondary circuit an instant before said first switch opens said primary circuit to produce a non-oscillatory state in said primary circuit, thereby reducing the primary current flow to zero just before said switch opens the primary circuit.

4. A periodic switching device for sparkless operation comprising a transformer and a series circuit having an inductor and a D. C. supply source, the primary winding of said transformer being center tapped and the center tap being connected through said inductor to said D. C. supply source, a secondary circuit connected to the secondary winding of said transformer, a capacitor having a corresponding value referred to the primary circuit is connected in parallel with the said secondary winding, a periodically reversing interrupter switch in said series primary circuit for making and breaking the said series circuit, a rectifying means connected to the secondary winding of said transformer for rectifying the alternating voltage at the secondary of said transformer obtained through repeated operation of said switch connected to the primary winding, an electromagnetic means operating said switch at a repetition rate such that the making time of said switch is somewhat longer than the duration of a half cycle of the oscillating current wave produced at said series primary circuit by the proper selection of the magnitude of said inductor of said primary circuit and said capacitor and load resistance of said secondary circuit referred to the primary circuit determining the oscillatory state in said primary circuit, the said oscillation being produced at the instant of making of said primary switch, an auxiliary switch in said secondary circuit, the movable contact of said auxiliary switch having a travel time longer than the travel time of the movable contact of said first switch in said primary circuit, a resistance element connected in series in said secondary circuit, said auxiliary switch short circuiting said resistance element during the major part of the half cycle of said primary oscillating current wave and inserting said resistance element in said secondary circuit an instant before said first switch opens said primary circuit to produce a non-oscillatory state in said primary circuit, thereby reducing the current flow to zero just before said switch opens said primary circuit.

5. A periodic switching device for sparkless operation comprising a transformer and a series circuit having an inductor, a rectifier and a D. C. supply source, the primary winding of said transformer being center tapped and the center tap being connected to said D. C. supply, a secondary circuit connected to the secondary winding of said transformer, a capacitor having a corresponding value referred to the primary circuit is connected in parallel with the secondary winding, a periodically reversing interrupter switch in said series primary circuit for making and breaking the said series circuit, an electromagnetic means operating said switch at a repetition rate such that the making time of said switch is somewhat longer than the duration of a half cycle of the oscillating current wave produced at said series primary circuit by the proper selection of the magnitude of said inductor of said primary circuit and said capacitor and load resistance of said secondary circuit referred to the primary circuit determining the oscillatory state in said primary circuit, the said oscillation being produced at the instant of making of said primary switch, an auxiliary switch in said primary circuit, the movable contact of said auxiliary switch having a travel time longer than the travel time of the movable contact of said first switch, said auxiliary switch short circuiting said rectifier during the major part of the half cycle of said primary oscillating current wave and inserting said rectifier in series with the said primary circuit an instant before said first switch opens said primary circuit to prevent the negative flow of the oscillating current in said primary circuit just before said first switch opens said primary circuit, a rectifying means separately connected to the secondary winding of said transformer for rectifying the alternating voltage at the secondary of said transformer obtained through repeated operation of said first switch connected to the primary winding.

6. A periodic swtiching device for sparkless operation comprising a transformer and a series circuit having a capacitor, an inductor and a center tapped D. C. supply source, the primary winding of said transformer being in series with said capacitor and D. C. supply source, a periodically reversing interrupter switch in said series circuit for making and breaking successively each of the end terminals of said center tapped D. C. supply source for the periodic charge and discharge of said capacitor, said switch having a pair of main contacts and a pair of auxiliary contacts, one pair of said main contacts being connected to the end terminals of said D. C. supply source, the center tap of said D. C. supply source being connected to one of said primary winding, the other pair of said contacts being connected to the other end of said inductor being in series with the primary winding, the travel time of said movable switch between said first main contacts being less than the travel time between said second auxiliary contacts, said auxiliary contact short circuiting said condenser during the major part of the closing time duration of said first main contact for obtaining a square wave form of primary current, an electromagnetic means operating said switch at a velocity such that the switching time-difference of said switch with the said first main and said second auxiliary contact is somewhat more than the duration of the exponential current wave due to proper selection of the magnitudes of said inductor and capacitor and load resistance of the secondary circuit of said transformer referred to the primary circuit and generated at the instant of opening of said auxiliary contact by inserting in series said condenser being initially interposed in series with the primary circuit, thereby reducing the primary current flow to zero just before the opening of the said first main contact, a rectifying means connected to the secondary winding of said transformer for rectifying the alternating voltage at the secondary of said transformer obtained through repeated operation of said switch connected to said primary winding.

7. A periodic swtiching device for sparkless operation comprising a transformer and a series circuit having an inductor and a D. C. supply source, the primary winding of said transformer being center tapped, a pair of condensers and large resistance elements in said primary circuit, a periodically reversing interrupter switch having two main contacts, one of said condensers being connected between one end of said primary winding and one of said main contacts, the second condenser being connected between the second main contact of said switch and the other end of said primary winding, said D. C. supply source being connected through said inductor between the center tap of said primary winding and the movable contact of said switch, said switch having another pair of auxiliary contacts connected directly to the two ends of said primary winding, each of said resistance elements connected between said main and auxiliary contact, the travel time of said movable switch between the first pair of main contacts being less than the travel time of said movable switch between said second pair of auxiliary contacts, said auxiliary contact short circuiting the said condenser during the major part of the closing time-duration of said main contact for obtaining a square wave primary current, an electromagnetic means operating said switch at a velocity such that the switching time-difference of said switch with the said main and auxiliary contact is somewhat more than the duration of the exponential current wave due to the proper selection of the magnitudes of said inductor and capacitor and load resistance of the secondary circuit of said transformer referred to the primary circuit and generated at the instant of opening of said auxiliary contact by inserting in series said condenser being initially interposed in series with said primary circuit, thereby reducing the primary current flow to zero just before the opening of the said main contact, a rectifying means connected to the secondary winding of said transformer for rectifying the alternating voltage at the secondary of said transformer obtained through repeated operation of said switch connected to said primary winding.

8. A periodic switching device for sparkless operation comprising a transformer and a series circuit having a D. C. supply source, the center tap of said D. C. supply being connected to one input terminal of the primary circuit of said transformer, a switch having two stationary contacts, said stationary contacts being connected to the end terminals of said D. C. supply source, the movable contact of said switch being connected to the other input terminal of the primary circuit of said transformer, a driving coil being connected to one end of said stationary contact, said driving coil interconnecting said stationary contacts through said switch and resistance element, said driving coil operating said switch when the primary circuit of said transformer is open, thereby eliminating high magnetization currents at the moment the switching operation is initiated.

References Cited in the file of this patent

UNITED STATES PATENTS

| | | |
|---|---|---|
| 1,543,475 | Lemmon | June 23, 1925 |
| 2,194,288 | Aust | Mar. 19, 1940 |
| 2,265,717 | Bedford | Dec. 9, 1941 |
| 2,298,003 | Feingold | Oct. 6, 1942 |
| 2,470,825 | Mathes | May 24, 1949 |
| 2,530,939 | Browne | Nov. 21, 1950 |
| 2,612,631 | Distin et al. | Sept. 30, 1952 |